United States Patent
Su et al.

(10) Patent No.: US 9,409,335 B1
(45) Date of Patent: Aug. 9, 2016

(54) COMPUTER-IMPLEMENTED SIMULATION METHOD AND NON-TRANSITORY COMPUTER MEDIUM FOR USE IN MOLDING PROCESS

(71) Applicant: CORETECH SYSTEM CO., LTD., Hsinchu County (TW)

(72) Inventors: Tung Huan Su, Hsinchu County (TW); Hsien Sen Chiu, Hsinchu County (TW); Rong Yeu Chang, Hsinchu County (TW); Chia Hsiang Hsu, Hsinchu County (TW); Ching Chang Chien, Hsinchu County (TW); Chih Chung Hsu, Hsinch County (TW)

(73) Assignee: CORETECH SYSTEM CO., LTD., Hsinchu County (TW)

( * ) Notice: Subject to any disclaimer, the term of this patent is extended or adjusted under 35 U.S.C. 154(b) by 0 days.

(21) Appl. No.: 14/871,916

(22) Filed: Sep. 30, 2015

(51) Int. Cl.
*B29C 45/78* (2006.01)
*G05B 17/02* (2006.01)

(52) U.S. Cl.
CPC ............... *B29C 45/78* (2013.01); *G05B 17/02* (2013.01); *B29C 2945/76434* (2013.01); *B29C 2945/76535* (2013.01); *B29C 2945/76996* (2013.01)

(58) Field of Classification Search
CPC ........... B29C 2945/76535; B29C 2945/76434; B29C 2945/76996
See application file for complete search history.

(56) References Cited

U.S. PATENT DOCUMENTS

| | | | | |
|---|---|---|---|---|
| 5,097,432 A * | 3/1992 | Harada | ............... | B29C 45/7693 164/457 |
| 5,296,174 A * | 3/1994 | Yakemoto | ............... | B29C 45/78 264/328.1 |
| 5,411,686 A * | 5/1995 | Hata | ........................ | B29C 45/78 264/328.14 |
| 5,756,017 A * | 5/1998 | Togawa | ................... | B29C 45/77 264/319 |
| 2004/0140579 A1* | 7/2004 | Uwaji | ................. | B29C 45/7693 264/40.1 |

FOREIGN PATENT DOCUMENTS

JP    2000289076 A  * 10/2000

OTHER PUBLICATIONS

Machine Translation of JP 2000289076 A (Oct. 2000).*
Heat flux. (Feb. 11, 2016). In Wikipedia, The Free Encyclopedia. Retrieved 07:00, Mar. 1, 2016.*

(Continued)

*Primary Examiner* — Ryan Jarrett
(74) *Attorney, Agent, or Firm* — WPAT, P.C., International Property Attorneys; Anthony King

(57) ABSTRACT

A molding method includes the steps of specifying a simulating domain having a resin part and a mold part, wherein the simulating domain corresponds to a genuine domain on a molding machine; setting an initial resin temperature of the resin part and an initial mold temperature of the mold part; performing a transient state analysis to calculate a plurality of temperature distributions at different times between the resin part and the mold part; calculating at least one heat transfer coefficient between the resin part and the mold part taking into consideration the plurality of temperature distributions at different times; simulating the molding process of a molding resin that is injected into the simulating domain by using the at least one heat transfer coefficient to generate a plurality of molding conditions; and performing the molding process by using the plurality of molding conditions to the genuine domain on the molding machine.

13 Claims, 18 Drawing Sheets

(56) References Cited

OTHER PUBLICATIONS

Rong-Yeu Chang, and Wen-Hsien Yang, Numerical simulation of mold filling in injection molding using a three-dimensional finite volume approach, International Journal for Numerical Methods in Fluids, Int. J. Numer. Meth. Fluids 2001; 37: 125-148 (DOI: 10.1002/fld.166).

Hidetoshi, Yokoi et al., Injection Molding Benchmark Special Research Committee Report, Chapter 5 Tilted Wall Thickness—Pin Cavity Failure—Resin Filling Pattern—Measurement of Pressure Distribution—Apr. 1998-Mar. 2000.

* cited by examiner

COMPUTER-IMPLEMENTED SIMULATION METHOD AND NON-TRANSITORY COMPUTER MEDIUM FOR USE IN MOLDING PROCESS

TECHNICAL FIELD

The present disclosure relates to a computer-implemented simulation method and non-transitory computer medium for use in a molding process performed by a molding machine.

DISCUSSION OF THE BACKGROUND

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. A molded part may have one or more gates. It is common for large parts to have two, three, or more gates to reduce the flow distance the polymer must travel to fill the molded part. The one or multiple gates per cavity may be located anywhere on the part geometry, and possess any cross-section shape such as being essentially circular or be shaped with an aspect ratio of 1.1 or greater. Thus, a typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold.

In general, the setting of molding conditions of the injection molding machine requires a large number of trial molding operations and a long setting time because the setting work greatly depends on the know-how and experience of an operator of the injection molding machine, and various physical values affect one another as well.

Therefore, a virtual molding, i.e., computer-implemented simulation, by use of CAE (Computer-Assisted Engineering) is performed for the injection molding, and the molding conditions are then set based on the virtual molding. In virtual molding by use of CAE, phenomena will occur in a mold cavity within a short period of time; i.e., the result of simulation on resin temperature, pressure, shear rate, etc. can be reflected in molded products. Therefore, if the molding phenomena occurring within a mold cavity can be grasped accurately, using CAE may enable optimization of molding conditions and a stable molding of non-defective products.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

The present disclosure provides a computer-implemented simulation method and non-transitory computer medium for use in a molding process performed by a molding machine.

In accordance with some embodiments of the present disclosure, a computer-implemented composite simulation method for use in a molding process by a computer processor comprises steps of specifying a simulating domain having a resin part and a mold part, wherein the simulating domain corresponds to a genuine domain on a molding machine; setting an initial resin temperature of the resin part and an initial mold temperature of the mold part; performing a transient state analysis to calculate a plurality of temperature distributions at different times between the resin part and the mold part; calculating at least one heat transfer coefficient between the resin part and the mold part taking into consideration the plurality of temperature distributions at different times; simulating the molding process of a molding resin that is injected into the simulating domain by using the at least one heat transfer coefficient to generate a plurality of molding conditions; and performing the molding process by using the plurality of molding conditions to the genuine domain on the molding machine.

In accordance with some embodiments of the present disclosure, a non-transitory computer medium contains computer instructions stored therein for causing a computer processor to perform operations for use in a molding process simulation, and the operations comprise steps of specifying a simulating domain having a resin part and a mold part, wherein the simulating domain corresponds to a genuine domain on a molding machine; setting an initial resin temperature of the resin part and an initial mold temperature of the mold part; performing a transient state analysis to calculate a plurality of temperature distributions at different times between the resin part and the mold part; calculating at least one heat transfer coefficient between the resin part and the mold part taking into consideration the plurality of temperature distributions at different times; simulating the molding process of a molding resin that is injected into the simulating domain by using the at least one heat transfer coefficient to generate a plurality of molding conditions; and performing the molding process by using the plurality of molding conditions to the genuine domain on the molding machine.

The injection molding simulation may use a constant interface heat flux to describe the heat transferred from the resin part to the mold part, and the constant interface heat flux could be a random value assigned by an operator of the injection machine according to the operator's experience. However, this injection molding simulation may overestimate the heat transferred from the resin part to the mold part, and the over-estimation of the heat transfer results in an under-estimation of the temperature of the resin part, which corresponds to a lower viscosity of the resin part, and the lower viscosity generates a higher estimated pressure. In other words, this injection molding simulation using a constant interface heat flux overestimates the heat transferred and results in a higher estimated pressure, which may influence the simulation result on the shrinkage and warpage of the actual molding products.

In contrast, the simulation of the present disclosure uses the heat transfer coefficient from the calculation which takes into consideration the heat transferred from the resin part to the mold part so as to more accurately estimate the temperature of the resin part. As a result, the estimated pressure of the simulation of the present disclosure is closer to that of the measured data. In other words, the simulation of the present disclosure using the heat transferred from the resin part to the mold part can more accurately simulate the actual injection molding phenomena as compared to the injection molding simulation using a constant interface heat flux.

The injection molding simulation, using a constant interface heat flux to describe the heat transferred from the resin part to the mold part, does not consider the influence of the thickness variation of the resin part, and is far different from the actual heat transfer phenomena in the injection molding process. In contrast, the simulation of the present disclosure considers the actual heat transfer phenomena in the injection molding process, and uses variable heat transfer coefficients with respect to the different thickness of the resin part so as to more accurately simulate the actual injection molding process as compared to the injection molding simulation using a constant interface heat flux.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a computer-implemented composite simulation method and non-transitory computer medium for use in a molding process performed by a molding machine. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
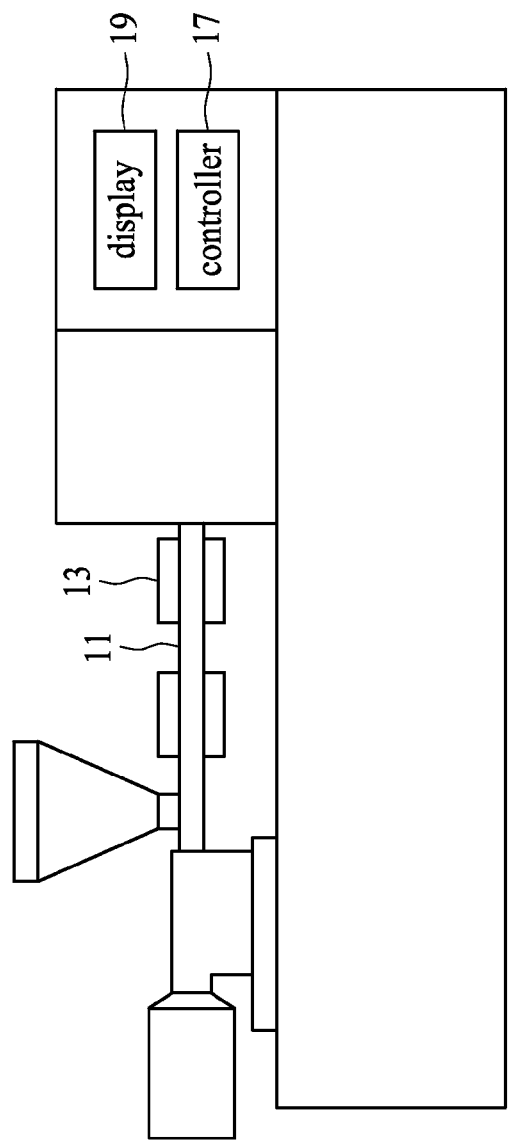
FIG. 1 and FIG. 2 are schematic views of an injection molding machine equipped with a mold in accordance with various embodiments of the present disclosure.
Figure 2:
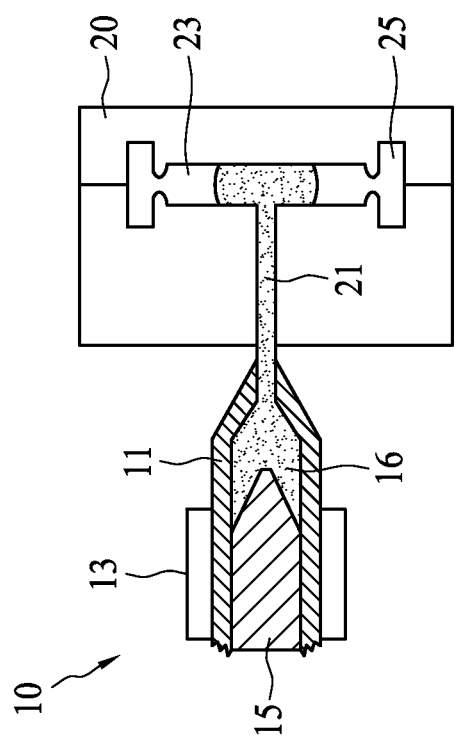

FIG. 1 and FIG. 2 are schematic views of an injection molding machine 10 equipped with a mold 20 in accordance with various embodiments of the present disclosure. The mold 20 includes a sprue 21, a runner part 23 and a cavity part 25. The injection molding machine 10 includes a screw chamber 11, heating elements 13 configured to heat the screw chamber 11, and a screw 15 positioned in the screw chamber 11 for feeding a molding material 16, such as thermoplastics, into the mold cavity 25 of the mold 20. The injection machine 10 has a controller 17 configured to control the operation of the injection molding machine 10 and a display 19 configured to display information of the injection molding process.

Figure 3:
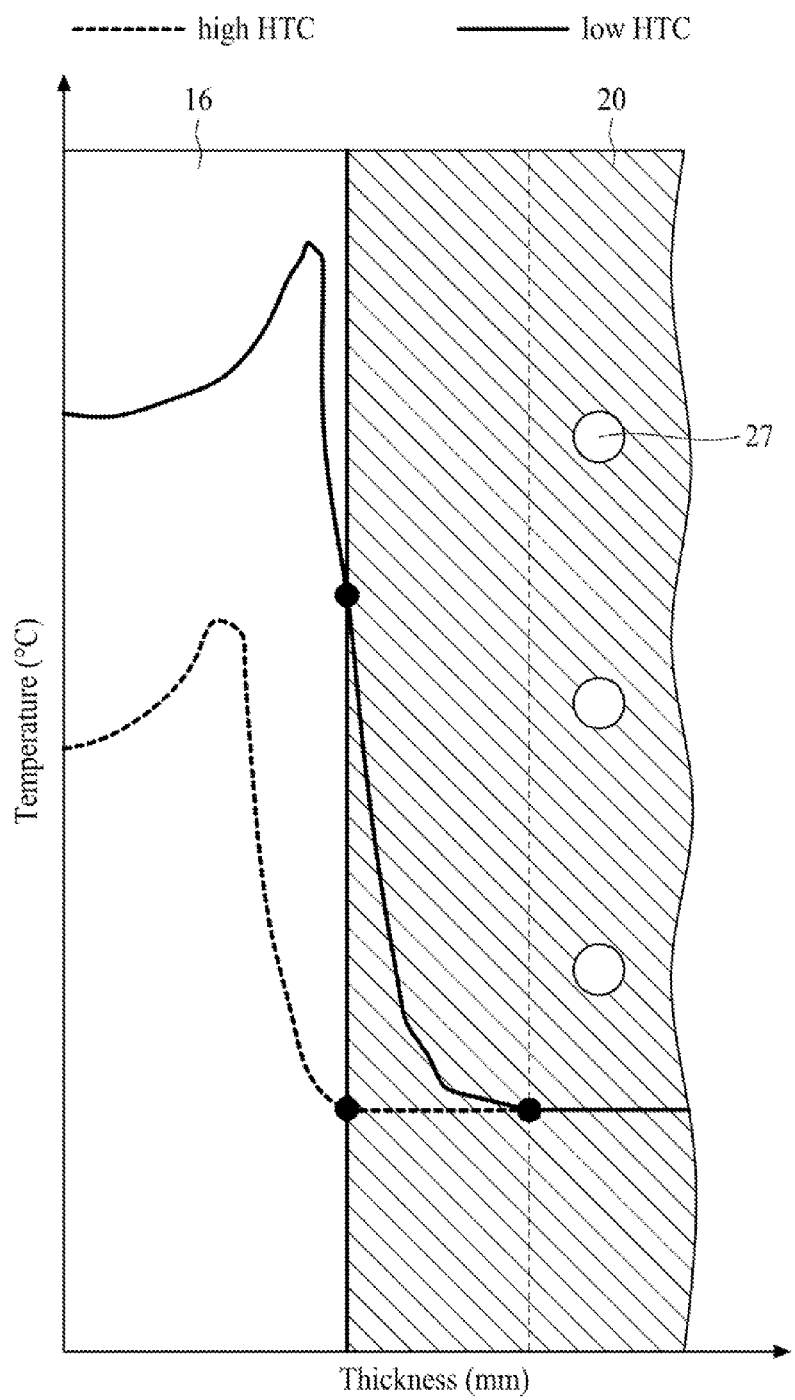
FIG. 3 is a schematic view showing temperature distributions of the molding material (resin part) in the mold cavity (or runner) and the mold in accordance with various embodiments of the present disclosure.

FIG. 3 is a schematic view showing temperature distributions of the molding material 16 (resin part) in the mold cavity 25 (or runner 23) and the mold 20 in accordance with various embodiments of the present disclosure. In some embodiments, the mold 20 is equipped with cooling pipes 27 having low-temperature cooling water flowing therein, the molding material 16 is melted at a high temperature in the screw chamber 11 and injected into the mold cavity 25 (or runner 23). Therefore, the temperature of the molding material 16 is higher than that of the mold 20, and the temperature distributions depend on the temperature difference and the heat transfer coefficient between the molding material 16 and the mold 20. The temperature difference can be controlled by the heating elements 13 and the cooling pipes 27. A high heat transfer coefficient (HTC) between the molding material 16 and the mold 20 results in a temperature distribution (dotted line) with a lower temperature of the molding material 16, while a relatively low heat transfer coefficient between the molding material 16 and the mold 20 results in a temperature distribution (solid line) with a higher temperature of the molding material 16.

Figure 4:
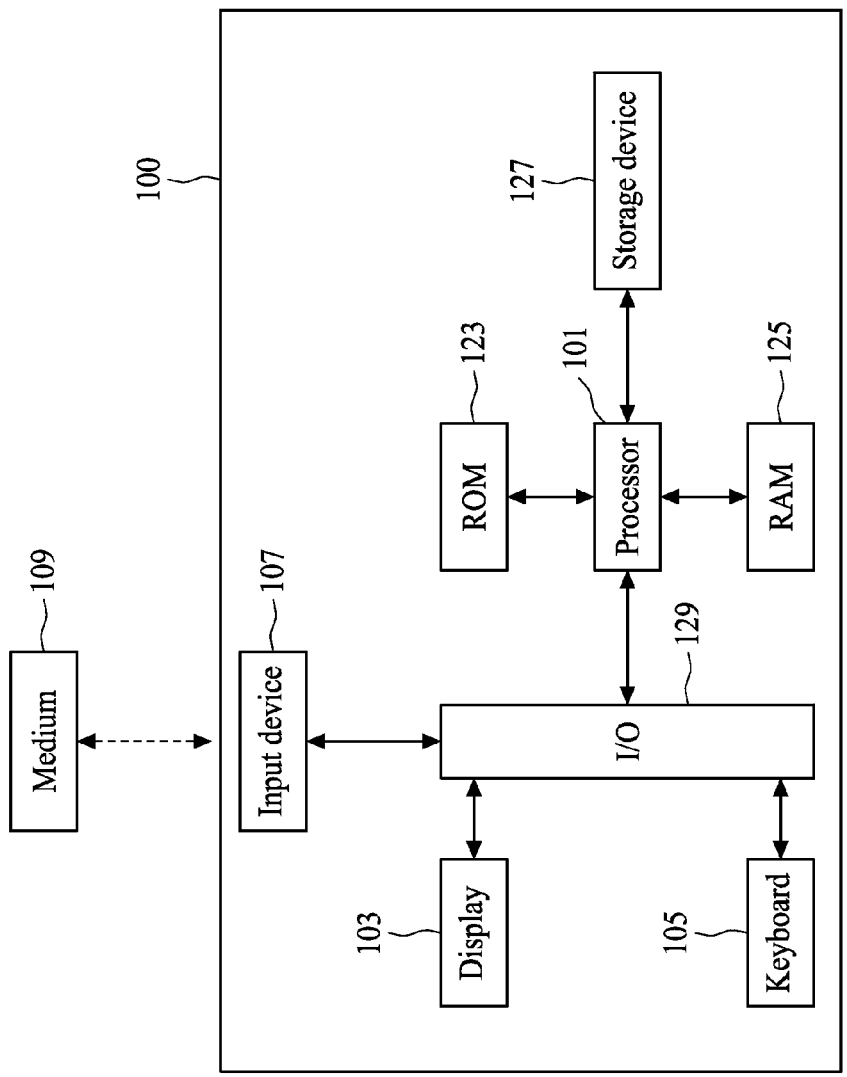
FIG. 4 is a functional block diagram of a computing apparatus 100 in accordance with various embodiments of the present disclosure.

FIG. 4 is a functional block diagram of a computing apparatus 100 in accordance with various embodiments of the present disclosure. In some embodiments, the computing apparatus 100 comprises a computer processor 101 for performing a computer-implemented injection molding simulation method. In some embodiments, the computing apparatus 100 includes a read-only memory (ROM) 123, a random access memory (RAM) 125, a storage device 127, and an input/output (I/O) interface 129. The computer processor 101 operably communicates with the ROM 123, the RAM 125, the storage device 127, and the I/O interface 129.

In some embodiments, the computing apparatus 100 may further include a display 103, a keyboard 105, and an input device 107 such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory device, i.e., the ROM 123 and the RAM 125, can be programmed to store codes for performing the computer-implemented injection molding simulation method.

Figure 5:
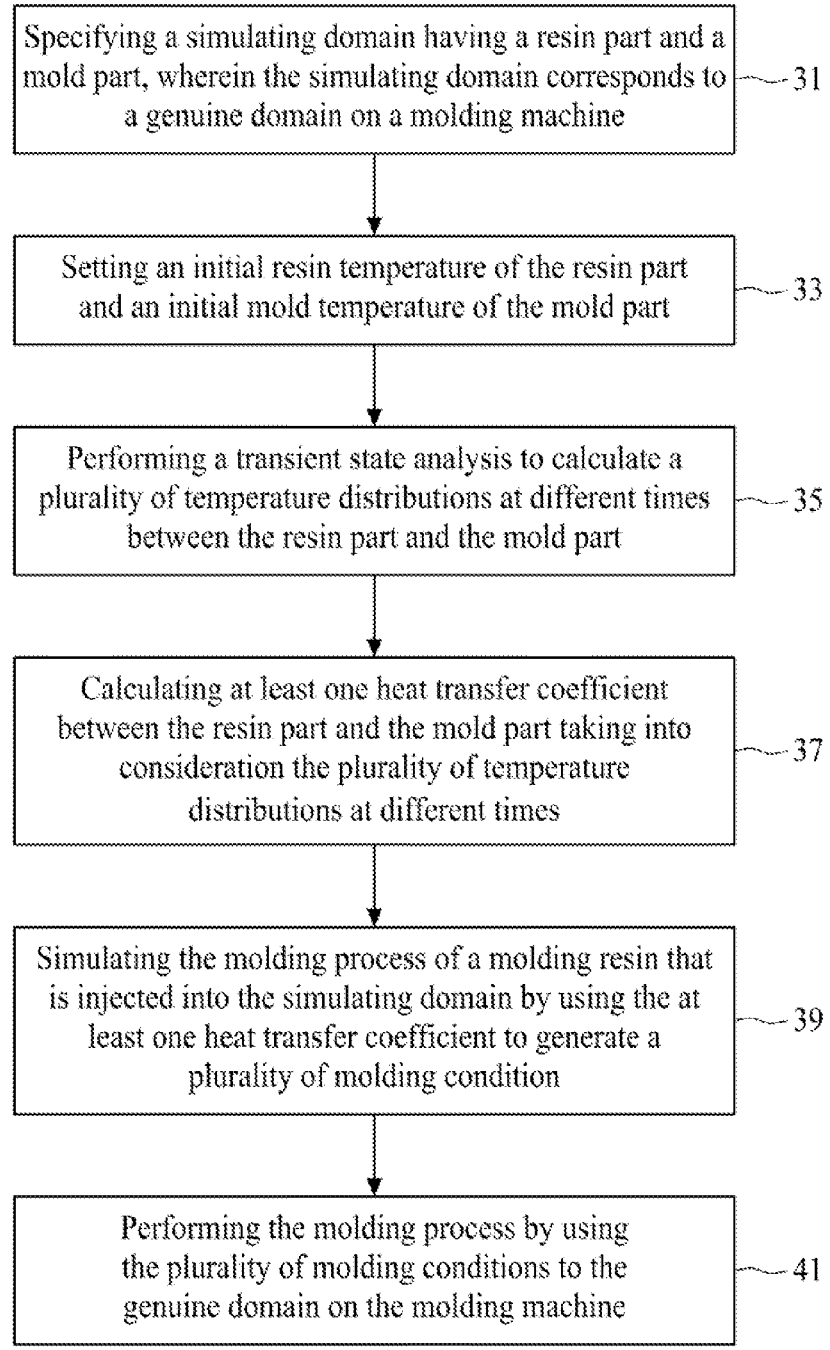
FIG. 5 is a flow chart of the computer-implemented composite simulation method for use in a molding process in accordance with some embodiments of the present disclosure.

FIG. 5 is a flow chart of the computer-implemented composite simulation method 30 for use in a molding process in accordance with some embodiments of the present disclosure. The composite simulation method comprises a step 31 of specifying a simulating domain having a resin part in a mold, wherein the simulating domain corresponds to a genuine domain on a molding machine; a step 33 of setting an initial resin temperature of the resin part and an initial mold temperature of the mold; a step 35 of performing a transient state analysis to calculate a plurality of temperature distributions at different times between the resin part and the mold; a step 37 of calculating at least one heat transfer coefficient between the resin part and the mold taking into consideration the plurality of temperature distributions at different times; a step 39 of simulating the molding process of a molding resin that is injected into the simulating domain by using the at least one heat transfer coefficient to generate a plurality of molding conditions; and a step 41 of performing the molding process by using the plurality of molding conditions to the genuine domain on the molding machine.

The following describes an exemplary process flow of the injection molding simulation method 30 in accordance with various embodiments of the present disclosure.

Figure 6:
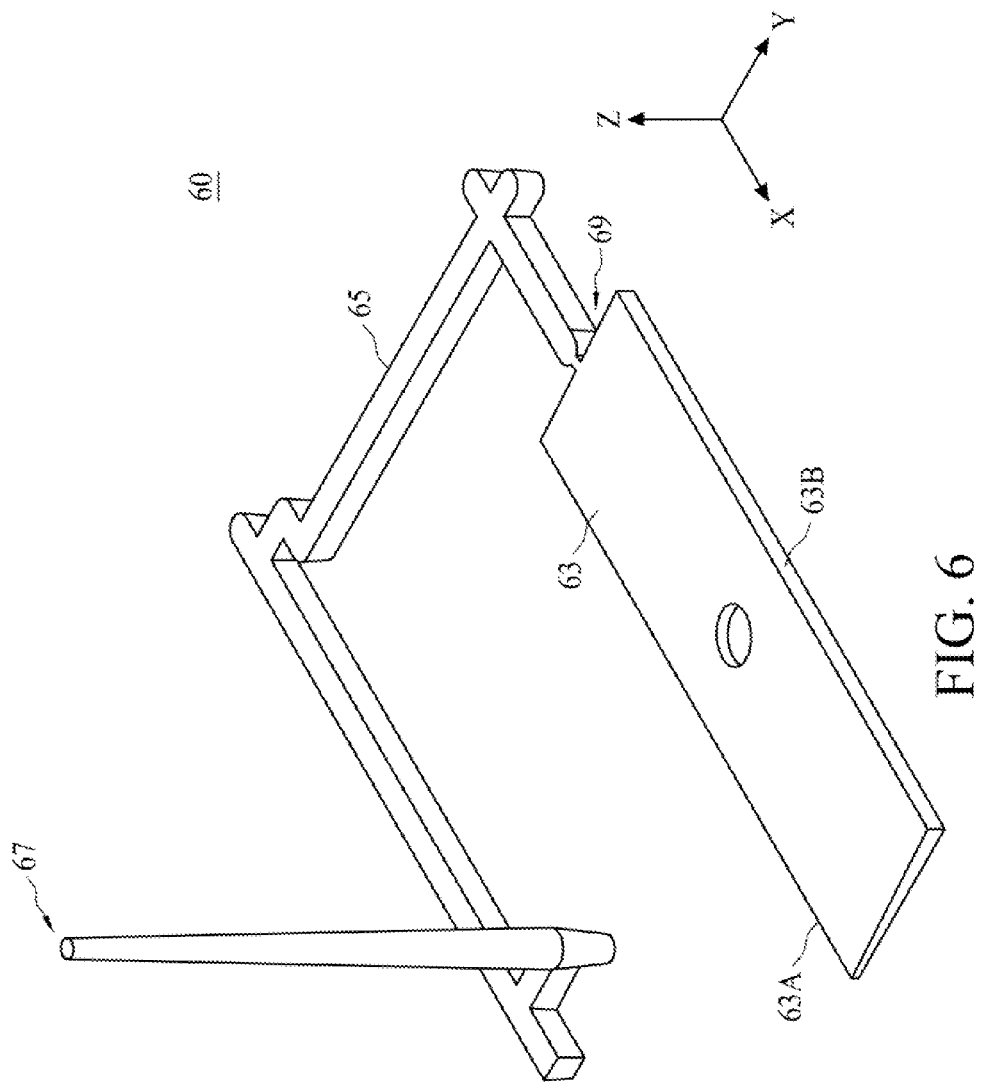
FIG. 6 is a schematic view of a genuine domain in accordance with various embodiments of the present disclosure.

FIG. 6 is a schematic view of a genuine domain 60 in accordance with various embodiments of the present disclosure. The thickness (Z direction) of the mold cavity 63 decreases along the Y direction, i.e., the mold cavity 63 has a thin side 63A and a thick side 63B. In some embodiments, the genuine domain 60 has a mold cavity 63, a sprue 67, a runner 65 connecting the mold cavity 63, and a gate 69 between the runner 65 and the mold cavity 63. In an injection molding process, the molding material is injected into the mold cavity 63 via the runners 23 from the sprue 67 connected to the barrel 11 of the injection machine 10.

In some embodiments, the injection molding simulation method 30 can begin in the step 31 where the simulating domain is specified. In some embodiments, the simulating domain is obtained from a CAD (Computer Aided Design) model used in design and development of a product. The genuine domain 60 is an example proposed by Professor Hidetoshi YOKOI, Center for Collaborative Research, The University of Tokyo.

In the step 33, an initial resin temperature of the resin part and an initial mold temperature of the mold are set. In one embodiment of the present disclosure, the initial resin temperature of the resin part is set in view of the temperature of the heating elements 13, and the initial mold temperature of the mold is set in view of the temperature of the low-temperature cooling water in the cooling pipes 27. In some embodiments, the resin part corresponds to the genuine domain 60, and the mold part corresponds to the mold surrounding the resin part.

In the step 35, a transient state analysis is performed to calculate a plurality of temperature distributions at different times between the resin part and the mold. In one embodiment of the present disclosure, the plurality of temperature distributions at different times is calculated by an energy conservation equation shown below:

$$\rho C_P \frac{\partial T}{\partial t} + K \frac{\partial^2 T}{\partial x^2} = 0$$

wherein $\rho$ represents the density of the molding resin, $C_P$ represents the specific heat of the molding resin, and K represents the thermal conductivity of the resin part. Solving the above energy conservation equation can be performed numerically by using a computer. See, e.g., Rong-yeu Chang, and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, and the entirety of which is herein incorporated by reference.

Figure 7:
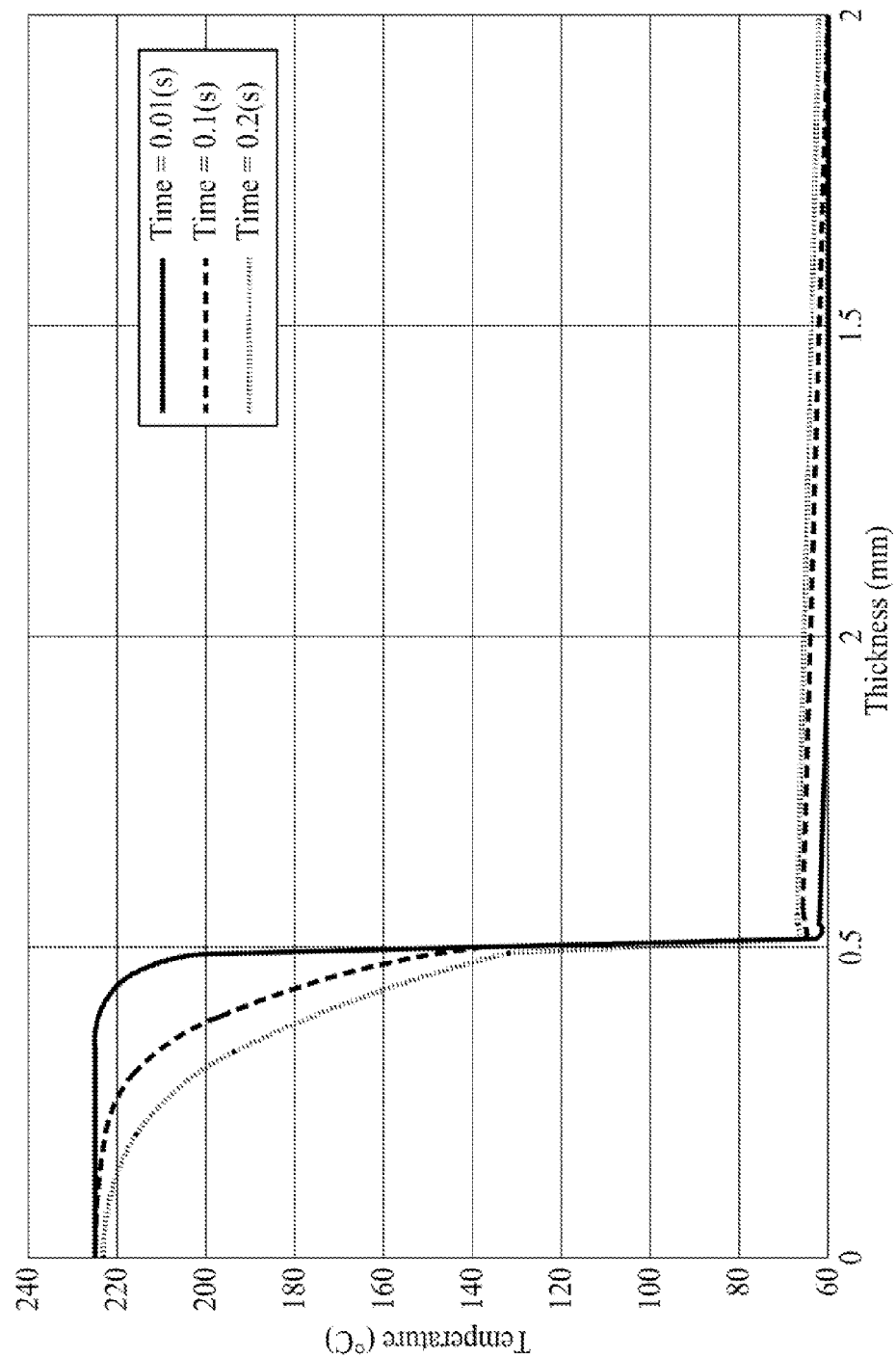
FIG. 7 is a plot showing the plurality of temperature distributions at different times (0.01 second, 0.1 second, and 0.2 second) between the resin part (zero to 0.5 mm) and the mold (0.5 mm to 2.0 mm)

FIG. 7 is a plot showing the plurality of temperature distributions at different times (0.01 second, 0.1 second, and 0.2 second) between the resin part (zero to 0.5 mm) and the mold (0.5 mm to 2.0 mm). In one embodiment of the present disclosure, the thickness of the resin part is 1.0 mm, and the plot shows a right half portion of the embodiment, assuming the resin part is symmetric. The initial temperature of the resin part is 225° C., and the initial temperature of the mold part is 60° C. As time progresses, the temperature of the resin part near the mold part decreases because the heat transfers from the resin part to the mold part.

A plurality of temperature gradients at an interface between the resin part and the mold are calculated taking into consideration the plurality of temperature distributions at different times. In one embodiment of the present disclosure, the temperature gradients are the slope ($\partial T/\partial x$) of the temperature distributions at an interface between the resin part and the mold. In one embodiment of the present disclosure, solving the above energy conservation equation is performed numerically by using a computer so as to calculate the temperature gradients at an interface between the resin part and the mold.

Figure 8:
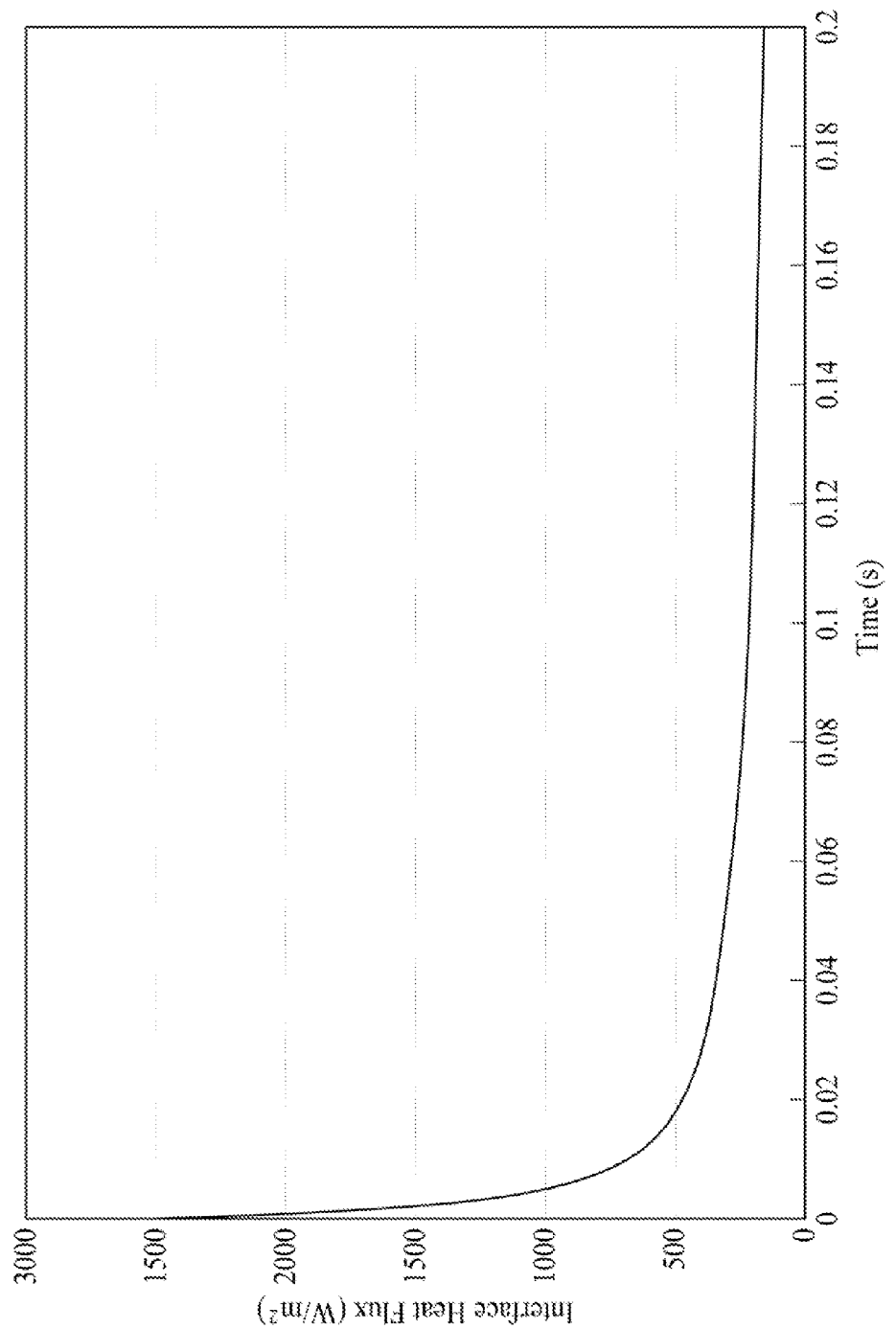
FIG. 8 is a plot showing the variation of the interface heat flux (Q) at different times between the resin part (zero to 0.5 mm in X-axis of FIG. 7) and the mold part (0.5 mm to 2.0 mm zero to 0.5 mm in X-axis of FIG. 7)

FIG. 8 is a plot showing the variation of the interface heat flux (Q) at different times between the resin part (zero to 0.5 mm in X-axis of FIG. 7) and the mold part (0.5 mm to 2.0 mm zero to 0.5 mm in X-axis of FIG. 7). The interface heat fluxes at different times and can be calculated by an equation shown below:

$$Q \equiv -K \frac{\partial T}{\partial x}$$

wherein K represents the thermal conductivity of the resin part, and Q represents the interface heat flux between the resin part and the mold part.

In the step 37, at least one heat transfer coefficient between the resin part and the mold part is calculated taking into consideration the plurality of temperature distributions at different times. In one embodiment of the present disclosure, the at least one heat transfer coefficient (HTC) between the resin part and the mold part is calculated by an equation shown below:

$$HTC \equiv \frac{Q_{av}}{\Delta T} = \frac{\text{Interface Heat flux}}{T_{resin} - T_{mold}}$$

wherein $Q_{av}$ represents an average interface heat flux between the resin part and the mold part, and $\Delta T$ represents a temperature difference between the resin part and the mold part. In one embodiment of the present disclosure, $Q_{av}$ can be calculated from FIG. 8 by using the following equation:

$$Q_{av} = \frac{\int Qdt}{\Delta t}$$

Figure 9:
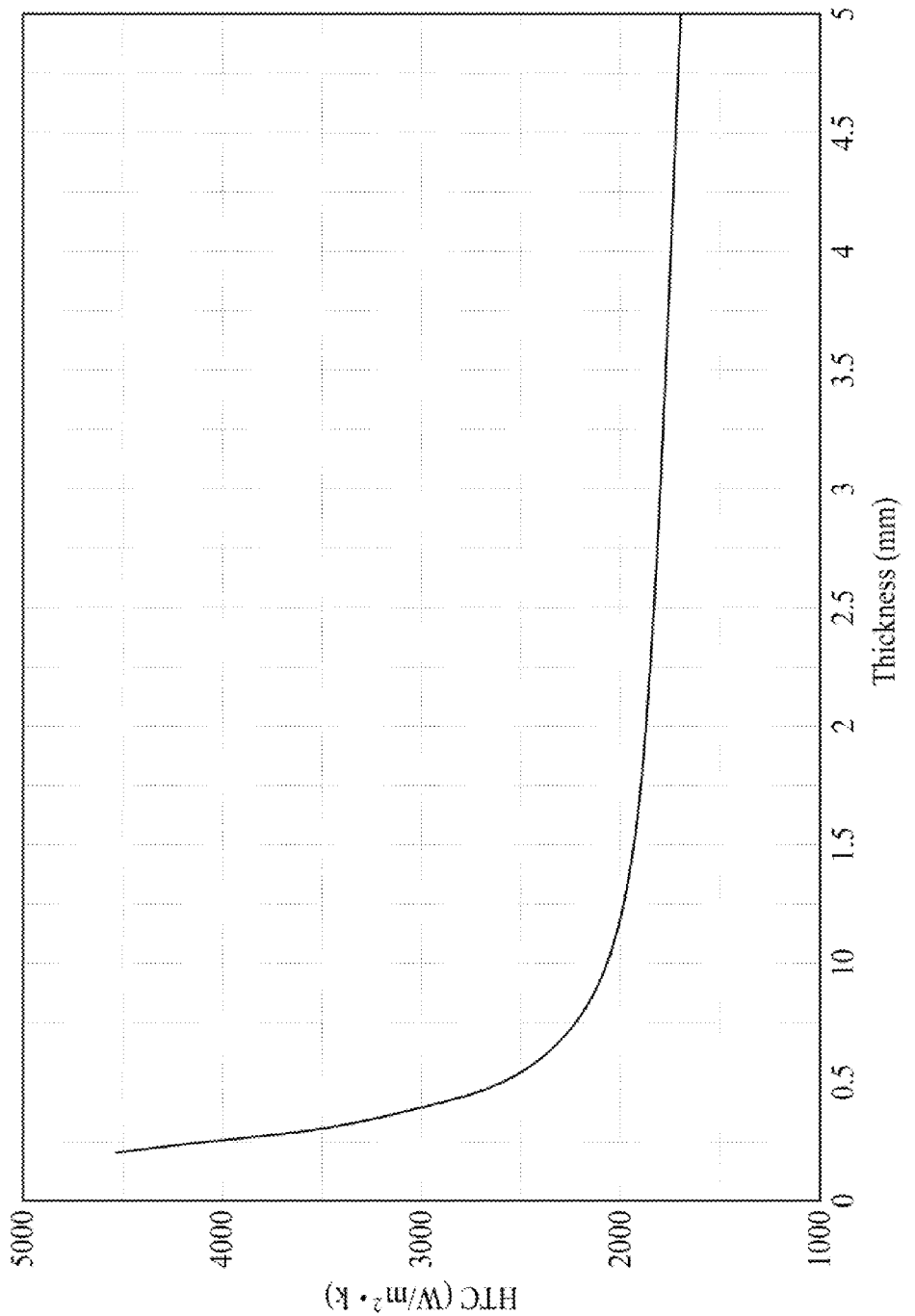
FIG. 9 is a plot showing a correlation between the heat transfer coefficient and the thickness of the resin part.

FIG. 9 is a plot showing a correlation between the heat transfer coefficient and the thickness of the resin part. Performing the process disclosed in FIG. 7 and FIG. 8 can obtain one heat transfer coefficient between the resin part and the mold part, wherein the thickness of the resin part is 1.0 mm. In one embodiment of the present disclosure, as the process disclosed in FIG. 7 and FIG. 8 is repeated with different thicknesses of the resin part, a correlation between the heat transfer coefficient and the thickness of the resin part can be built as shown in FIG. 9, wherein different thickness of the resin part goes from 0.2 mm to 5.0 mm.

In step 39, a simulation process is performed to simulate a molding process of a molding resin that is injected into the simulating domain by using the at least one heat transfer coefficient to generate a plurality of molding conditions such as the mold temperature, resin temperature, injection pressure, injection time (speed), packing pressure, packing time (speed), and etc. The molding phenomena of the molding material 16 can be simulated by using the following governing equations (1)-(4):

$$\frac{\partial \rho}{\partial t} + \nabla \cdot \rho u = 0 \tag{1}$$

$$\frac{\partial}{\partial t}(\rho u) + \nabla \cdot (\rho u u + \tau) = -\nabla p + \rho g \tag{2}$$

$$\frac{\partial}{\partial t}(T \rho C_p) + \nabla \cdot (\rho u C_p T) = k \nabla^2 T + \eta \dot{\gamma}^2 \tag{3}$$

$$\tau = -\eta(T, \dot{\gamma}) \cdot (\nabla u + \nabla u^T) \tag{4}$$

where u represents the velocity vector (flow velocity), T represents the temperature, t represents the time, p represents the pressure, τ represents the total stress tensor, ρ represents the density, η represents the viscosity, k represents the thermal conductivity, $C_P$ represents the specific heat, and $\dot{\gamma}$ represents the shear rate.

Solving the governing equations (1)-(4) requires a transient state analysis, which can be performed numerically by using a computer. See, e.g., Rong-yeu Chang, and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, and the entirety of which is herein incorporated by reference. In one embodiment of the present disclosure, solving the governing equations (1)-(4) involves using the correlation shown in FIG. 9, which can be implemented in a look-up table stored in the computing apparatus 100.

In one embodiment of the present disclosure, solving the governing equations (1)-(4) involves using a Newman type boundary condition shown below:

$$\Gamma_w : Q_w = HTC_w * (T_w - T_{mold})$$

where $Q_w$ represent the interface heat flux between the resin part (zero to 0.5 mm) and the mold part, $HTC_w$ represent the heat transfer coefficient between the resin part and the mold part, $T_w$ represents the wall temperature of the resin part, and $T_{mold}$ represents the temperature of the mold part. In one embodiment of the present disclosure, the simulation of the molding process with the resin part having different thicknesses can be performed by using the correlation shown in FIG. 9. In step 41, the plurality of molding conditions to the genuine domain from the simulation process are set on the molding machine, and the actual injection molding process is performed on the molding machine.

Figure 10:
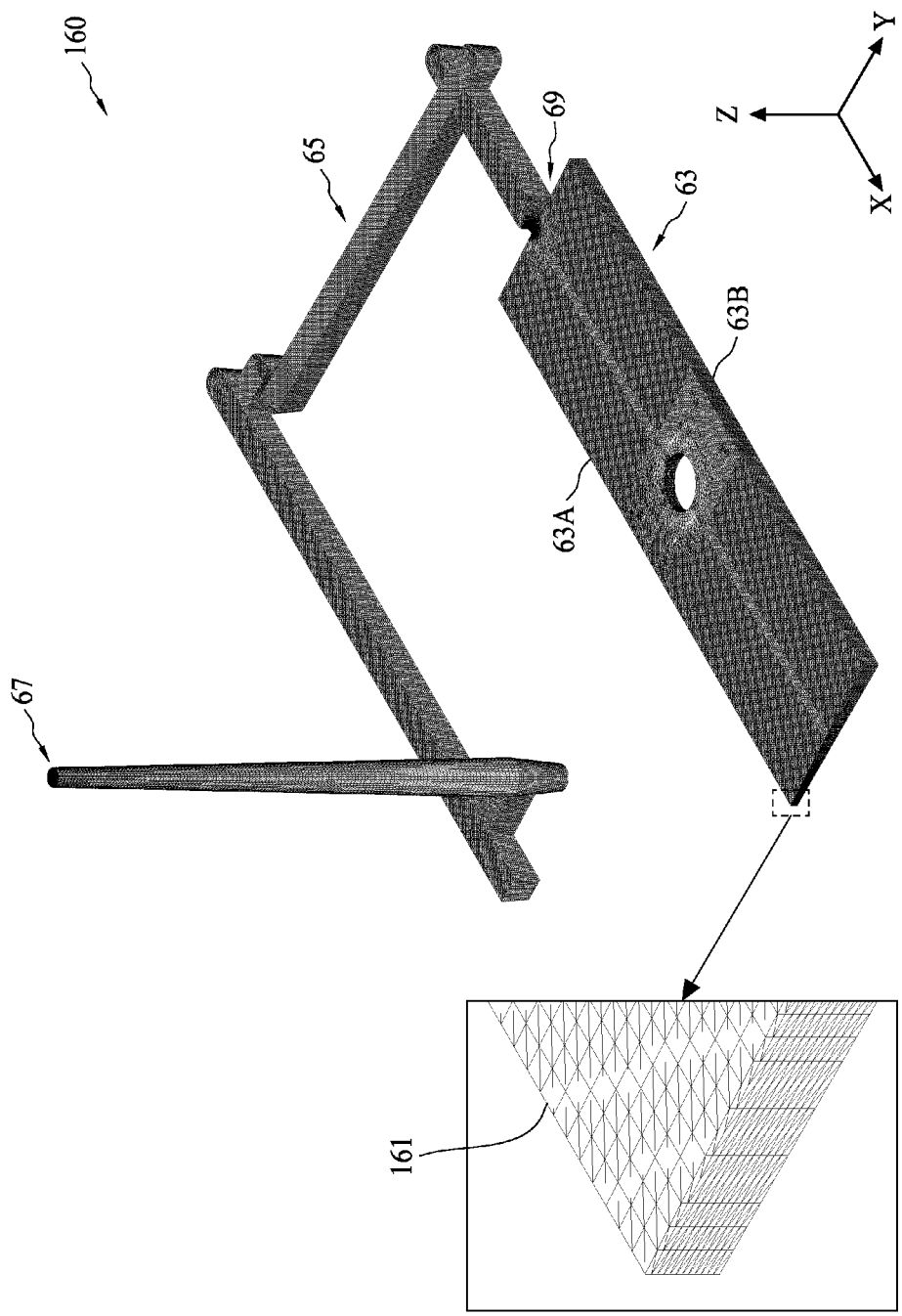
FIG. 10 is a schematic view of a simulating domain corresponding to the genuine domain in accordance with various embodiments of the present disclosure.

FIG. 10 is a schematic view of a simulating domain 160 corresponding to the genuine domain 60 in accordance with various embodiments of the present disclosure. In some embodiments, a mesh is created by dividing at least part of the simulating domain 160 before actually applying a numerical analysis, such as an FEM (finite element method), an FDM (finite difference method) or an FVM (finite volume method), to the simulating domain 160. The creation of the mesh for the simulating domain 160 is a technique of modeling an object or fluid region (i.e., the simulating domain 160 of the present embodiment) to be analyzed with a set of elements 161, such as rectangular mesh, hexahedral mesh or tetrahedral mesh, in order to perform the subsequent numerical analysis.

Figure 11:
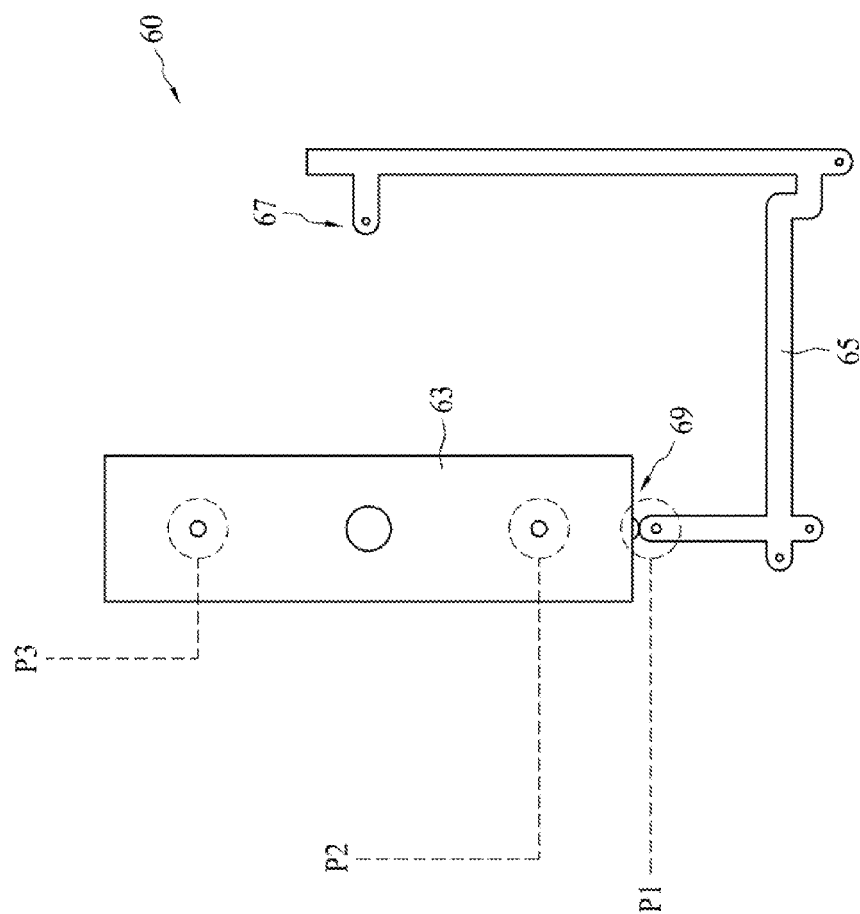
FIG. 11 is a top view of the genuine domain in accordance with various embodiments of the present disclosure.

FIG. 11 is a top view of the genuine domain 60 in accordance with various embodiments of the present disclosure. Three pressure sensors P1, P2, and P3 are disposed at three pressure-sensing sites in the genuine domain 60 to monitor the pressures, the flow rate and the melt front of the molding material in the genuine domain during the injection molding process. The three pressure sensors P1, P2, and P3 are disposed at the gate 69 representing the runner pressure, a front portion of the mold cavity 63, and a rear portion of the mold cavity 63.

Figure 12:
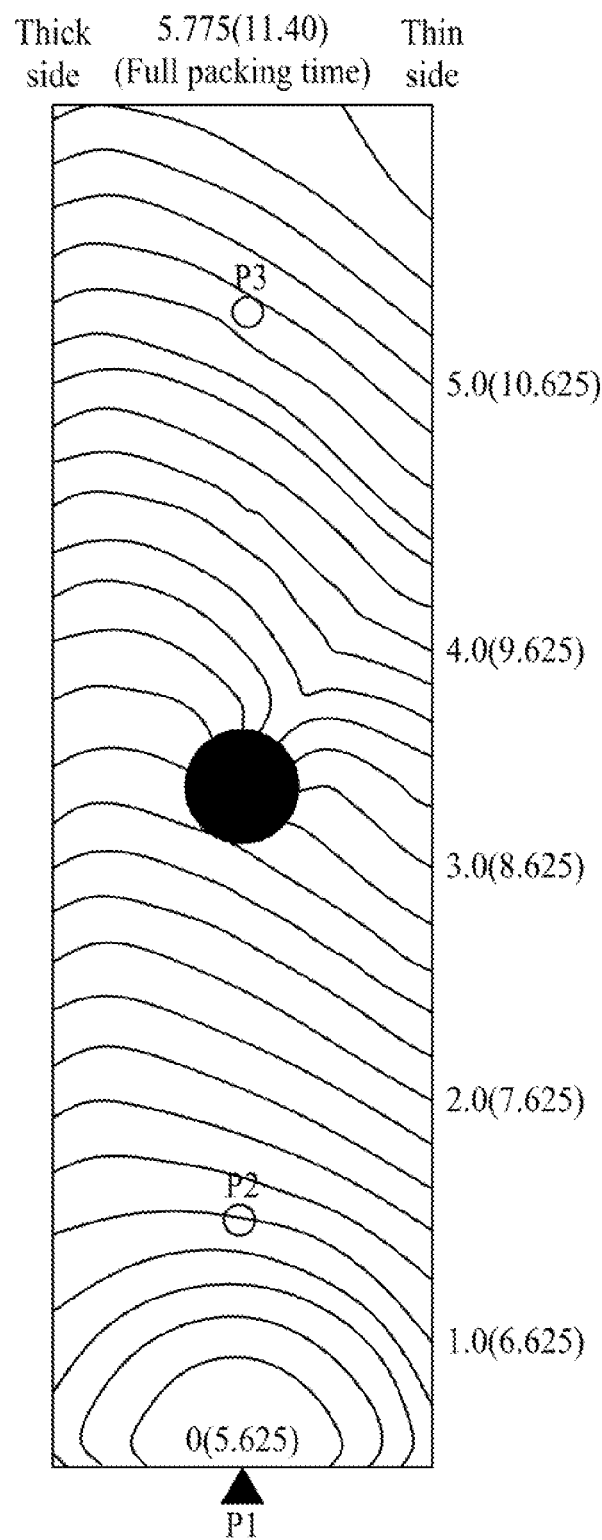
FIG. 12 is a measured waveform showing the melt fronts of the molding material in the mold cavity.
Figure 13:
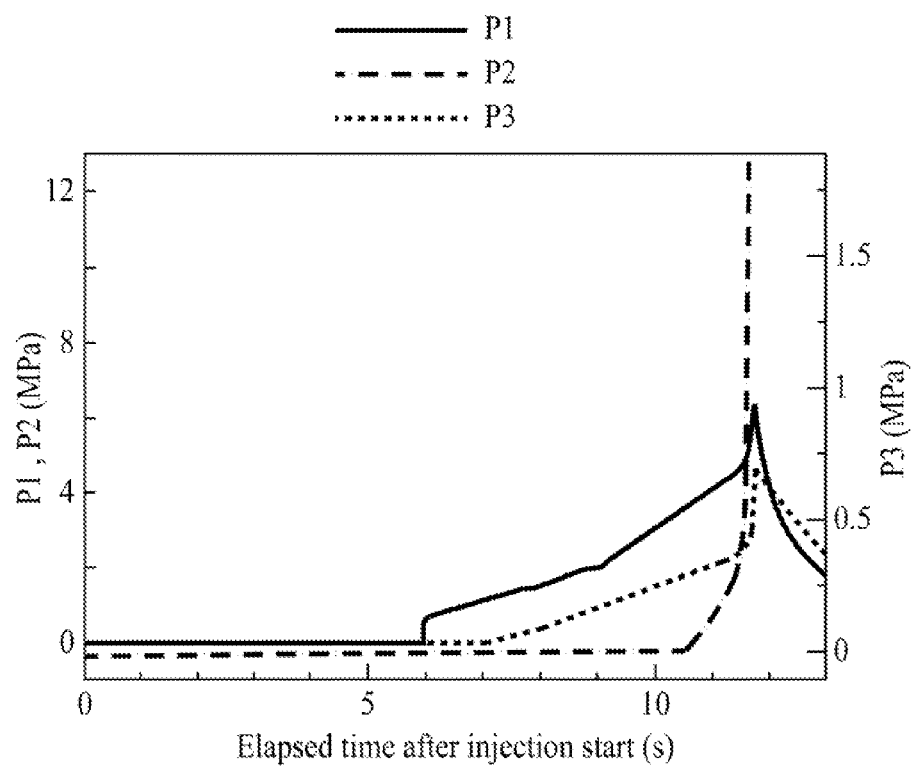
FIG. 13 is a measured waveform showing the pressures sensed at the three pressure-sensing sites.

FIG. 12 is a measured waveform showing the melt fronts of the molding material in the mold cavity 63, and FIG. 13 is a measured waveform showing the pressures sensed at the three pressure-sensing sites (P1, P2, P3), wherein the injection rate is 6.3 cm$^3$/s. The measured waveform in FIG. 12 and FIG. 13 is obtained from an experiment by Professor Hidetoshi YOKOI, Center for Collaborative Research, The University of Tokyo.

Figure 14:
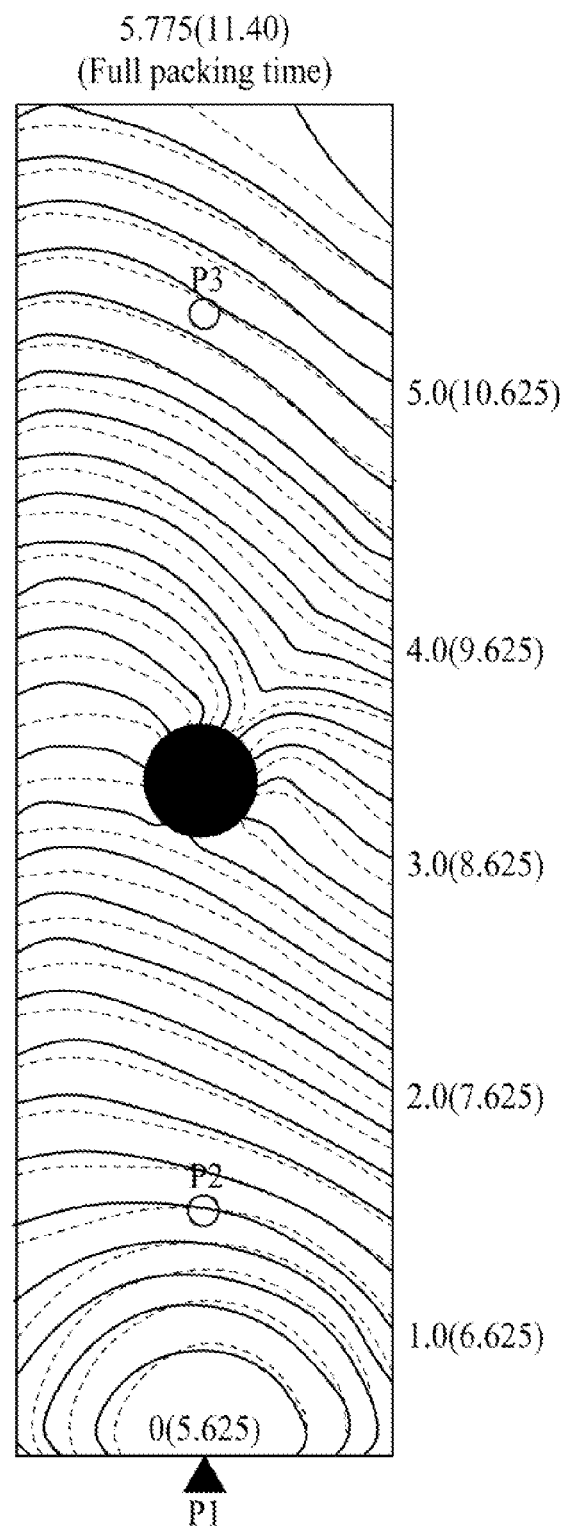
FIG. 14 is a comparative waveform showing the melt front of the molding material in the mold cavity.
Figure 15:
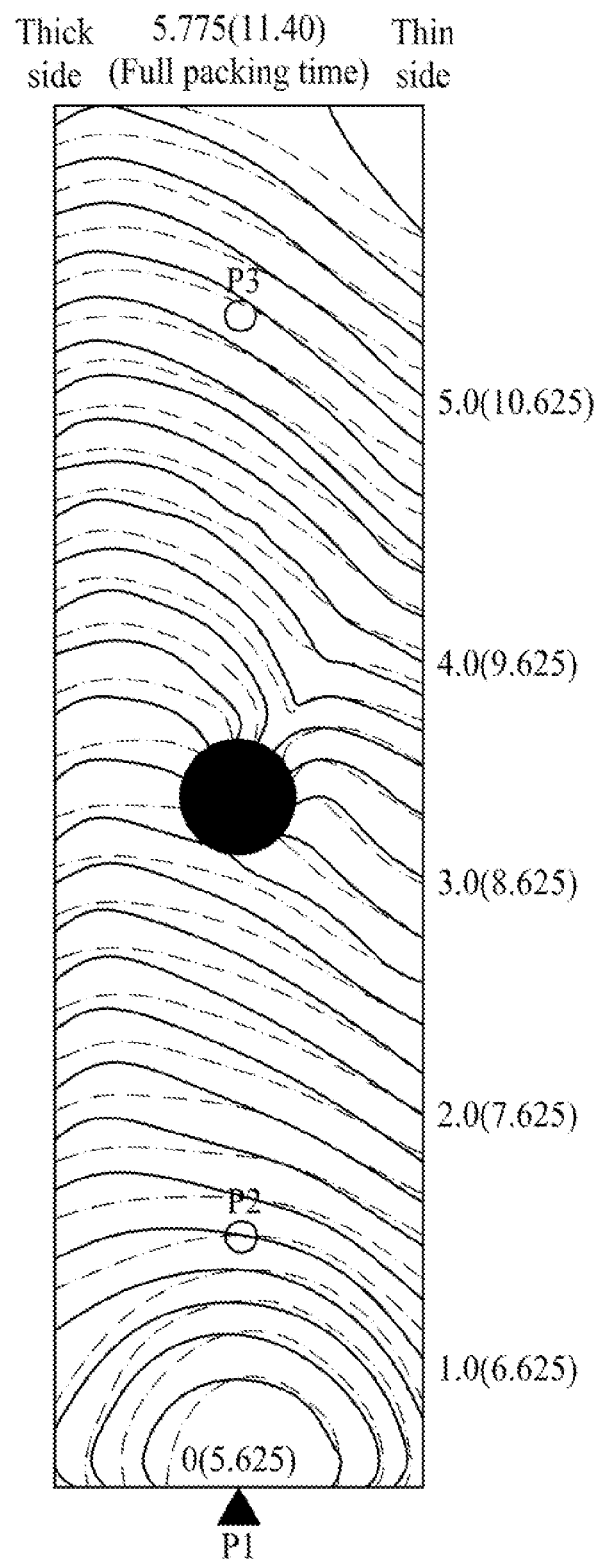
FIG. 15 is an exemplary waveform showing the melt front of the molding material in the mold cavity.

FIG. 14 is a comparative waveform showing the melt front of the molding material in the mold cavity 63, wherein the comparative waveform is derived from a simulation by using the governing equations (1)-(4) with a constant interface heat flux of 5,000 (W/m$^2$), which could be a random value assigned by an operator of the injection machine according to the operator's experience. FIG. 15 is an exemplary waveform showing the melt front of the molding material in the mold cavity 63, wherein the exemplary waveform is derived from a simulation by using the governing equations (1)-(4) with variable HTC in FIG. 9.

Figure 16:
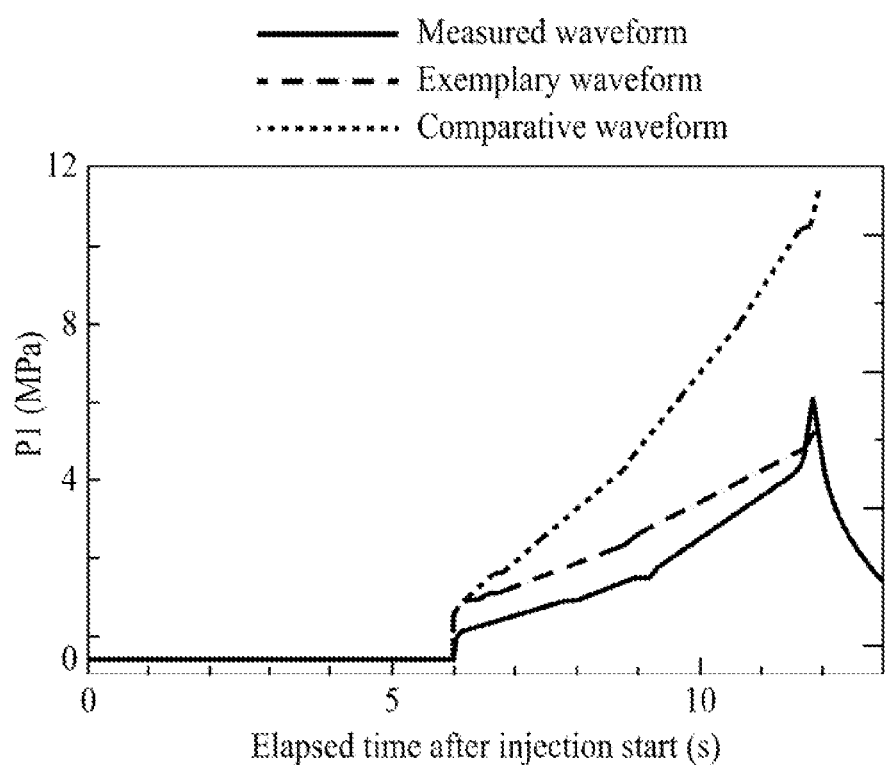
FIG. 16 to FIG. 18 are plots comparing the measured waveform, the comparative waveform and the exemplary waveform at the three pressure-sensing sites.
Figure 17:
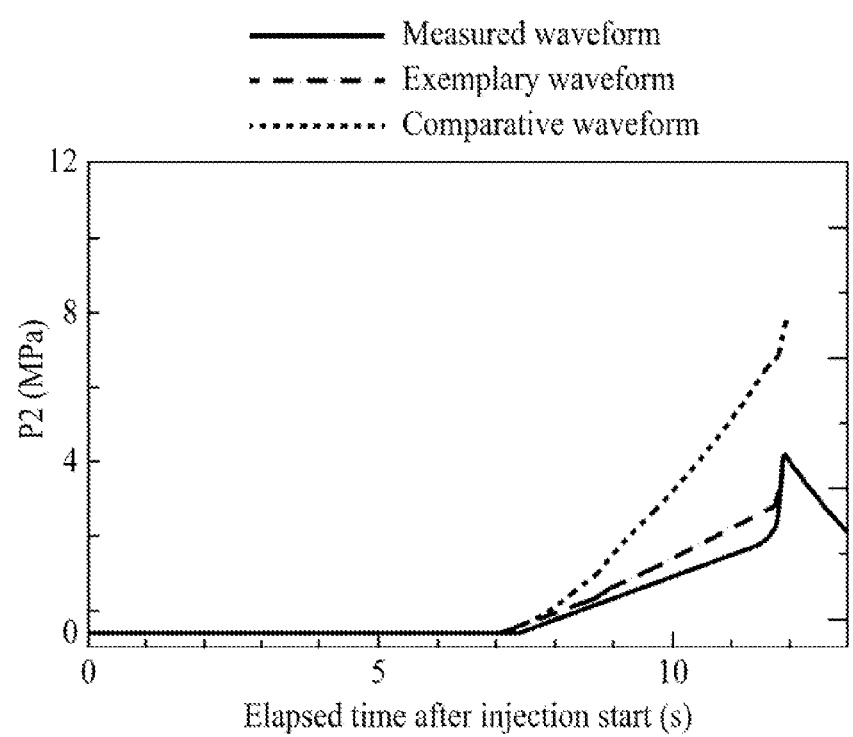
Figure 18:
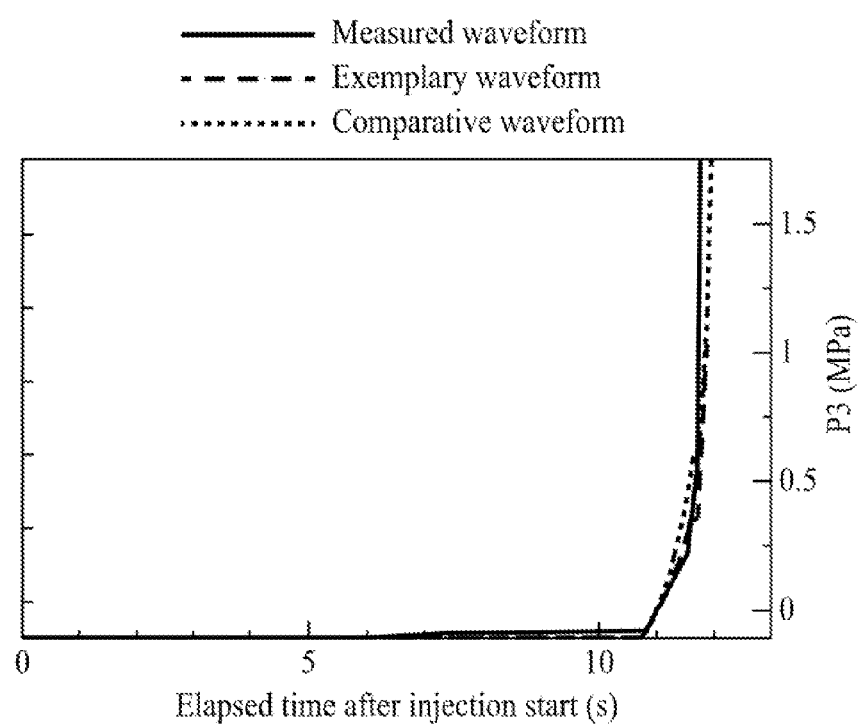

FIG. 16 to FIG. 18 are plots comparing the measured waveform, the comparative waveform and the exemplary waveform at the three pressure-sensing sites (P1, P2, P3), wherein the comparative waveform is derived from a simulation by using the governing equations (1)-(4) with a constant interface heat flux of 5,000 (W/m$^2$) and the exemplary waveform is derived from a simulation by using the governing equations (1)-(4) with variable HTC in FIG. 9. As clearly shown in FIG. 16 to FIG. 18, the exemplary waveform (dotted lines) is closer to the measured waveform than the comparative waveform; in other words, the simulation by using the variable HTC in FIG. 9 is closer to the measured waveform than the simulation by using the constant interface heat flux.

In particular, the estimated pressure of the comparative waveform is higher than that of the exemplary waveform and the measured data. The higher estimated pressure of the comparative waveform results from the constant interface heat flux of 5,000 (W/m$^2$), i.e., the simulation of the comparative waveform overestimates the heat transfer from the resin part to the mold part. The overestimation of the heat transfer results in an underestimation of the temperature of the resin part, which corresponds to a lower viscosity of the molding material, and the lower viscosity generates a higher estimated pressure. In brief, the estimated pressure of the comparative waveform overestimates the heat transfer by using a high interface heat flux and results in a higher estimated pressure, which may influence the simulation result on the shrinkage and warpage of the actual molding products.

In contrast, the simulation of the present disclosure uses the HTC from the calculation taking into consideration the heat transfer from the resin part to the mold part so as to more accurately estimate the temperature of the resin part. As a result, the estimated pressure of the simulation of the present disclosure is closer to that of the measured data. In other words, the simulation of the present disclosure can more accurately simulate the actual injection molding process as compared to the conventional injection molding simulation.

Furthermore, the simulation of the exemplary waveform uses the variable HTC with respect to the different thickness of the resin part, and the estimated pressure of the exemplary waveform is closer to that of the measured data. In other words, the exemplary waveform of the present disclosure can more accurately simulate the actual injection molding process as compared to the comparative waveform.

In some embodiments, a computer-implemented simulation method is disclosed for use in a molding process by a computer processor, and the simulation method includes specifying a simulating domain having a resin part and a mold part, wherein the simulating domain corresponds to a genuine domain on a molding machine; setting an initial resin temperature of the resin part and an initial mold temperature of the mold part; performing a transient state analysis to calculate a plurality of temperature distributions at different times between the resin part and the mold part; calculating at least one heat transfer coefficient between the resin part and the mold part taking into consideration the plurality of temperature distributions at different times; simulating the molding process of a molding resin that is injected into the simulating domain by using the at least one heat transfer coefficient to generate a plurality of molding conditions; and performing the molding process by using the plurality of molding conditions to the genuine domain on the molding machine.

In some embodiments, a non-transitory computer medium contains computer instructions stored therein for causing a computer processor to perform operations for use in molding process simulation, and the operations include specifying a simulating domain having a resin part and a mold part, wherein the simulating domain corresponds to a genuine domain on a molding machine; setting an initial resin temperature of the resin part and an initial mold temperature of the mold part; performing a transient state analysis to calculate a plurality of temperature distributions at different times between the resin part and the mold part; calculating at least one heat transfer coefficient between the resin part and the mold part taking into consideration the plurality of temperature distributions at different times; simulating the molding process of a molding resin that is injected into the simulating domain by using the at least one heat transfer coefficient to generate a plurality of molding conditions; and performing the molding process by using the plurality of molding conditions to the genuine domain on the molding machine.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-implemented simulation method for use in a molding process by a computer processor, comprising:
specifying a simulating domain having a resin part and a mold part, wherein the simulating domain corresponds to a genuine domain on a molding machine;
setting an initial resin temperature of the resin part and an initial mold temperature of the mold part;

performing a transient state analysis to calculate a plurality of temperature distributions at different times between the resin part and the mold part;

calculating at least one heat transfer coefficient between the resin part and the mold part taking into consideration the plurality of temperature distributions at different times in the absence of actually measuring data of the at least one heat transfer coefficient and data of the plurality of temperature distribution of the resin part and the mold part;

simulating the molding process of a molding resin that is injected into the simulating domain by using the at least one heat transfer coefficient to generate a plurality of molding conditions; and performing the molding process by using the plurality of molding conditions to the genuine domain on the molding machine.

2. The computer-implemented simulation method for use in the molding process of claim 1, wherein the calculating of at least one heat transfer coefficient comprises:

calculating a plurality of temperature gradients at different times between the resin part and the mold part taking into consideration the plurality of temperature distributions; and calculating a plurality of interface heat fluxes between the resin part and the mold part at different times taking into consideration the plurality of temperature gradients.

3. The computer-implemented simulation method for use in the molding process of claim 2, wherein the plurality of temperature distributions at different times is calculated by an equation shown below:

$$\rho C_P \frac{\partial T}{\partial t} + K \frac{\partial^2 T}{\partial x^2} = 0$$

wherein $\rho$ represents the density of the molding resin, $C_P$ represents the specific heat of the molding resin, and $K$ represents the thermal conductivity of the molding resin.

4. The computer-implemented simulation method for use in the molding process of claim 2, wherein the plurality of interface heat fluxes at different times is calculated by an equation shown below:

$$Q \equiv -K \frac{\partial T}{\partial x}$$

wherein $K$ represents the thermal conductivity of the molding resin.

5. The computer-implemented simulation method for use in the molding process of claim 1, wherein the at least one heat transfer coefficient between the resin part and the mold part is calculated by an equation shown below:

$$HTC \equiv \frac{Q_{av}}{\Delta T} = \frac{\text{Interface Heat flux}}{T_{resin} - T_{mold}}$$

wherein $Q_{av}$ represents an average interface heat flux between the resin part and the mold part, and $\Delta T$ represents a temperature difference between the resin part and the mold part.

6. The computer-implemented simulation method for use in the molding process of claim 1, further comprising:

generating a correlation between the heat transfer coefficient and a thickness of the resin part; and simulating the molding process of the molding resin by using the correlation.

7. A non-transitory computer medium containing computer instructions stored therein for causing a computer processor to perform operations for use in a molding process simulation, the operations comprising:

specifying a simulating domain having a resin part and a mold part, wherein the simulating domain corresponds to a genuine domain on a molding machine;

setting an initial resin temperature of the resin part and an initial mold temperature of the mold part;

performing a transient state analysis to calculate a plurality of temperature distributions at different times between the resin part and the mold;

calculating at least one heat transfer coefficient between the resin part and the mold taking into consideration the plurality of temperature distributions at different times in the absence of actually measuring data of the at least one heat transfer coefficient and data of the plurality of temperature distribution of the resin part and the mold part;

simulating the molding process of a molding resin that is injected into the simulating domain by using the at least one heat transfer coefficient to generate a plurality of molding conditions; and performing the molding process by using the plurality of molding conditions to the genuine domain on the molding machine.

8. The non-transitory computer medium of claim 7, wherein the calculating of at least one heat transfer coefficient comprises:

calculating a plurality of temperature gradients at different times between the resin part and the mold part taking into consideration the plurality of temperature distributions; and calculating a plurality of interface heat fluxes between the resin part and the mold part at different times taking into consideration the plurality of temperature gradients.

9. The non-transitory computer medium of claim 8, wherein the plurality of temperature distributions at different times is calculated by an equation shown below:

$$\rho C_P \frac{\partial T}{\partial t} + K \frac{\partial^2 T}{\partial x^2} = 0$$

wherein $\rho$ represents the density of the molding resin, $C_P$ represents the specific heat of the molding resin, and $K$ represents the thermal conductivity of the molding resin.

10. The non-transitory computer medium of claim 8, wherein the plurality of interface heat fluxes at different times is calculated by an equation shown below:

$$Q \equiv -K \frac{\partial T}{\partial x}$$

wherein $K$ represents the thermal conductivity of the molding resin.

11. The non-transitory computer medium of claim 7, wherein the at least one heat transfer coefficient between the resin part and the mold part is calculated by an equation shown below:

$$HTC \equiv \frac{Q_{av}}{\Delta T} = \frac{\text{Interface Heat flux}}{T_{resin} - T_{mold}}$$

wherein $Q_{av}$ represents an average interface heat flux between the resin part and the mold part, and $\Delta T$ represents a temperature difference between the resin part and the mold part.

12. The non-transitory computer medium of claim 7, further comprising:
   generating a correlation between the heat transfer coefficient and a thickness of the resin part; and
   simulating the molding process of the molding resin by using the correlation.

13. A computer-implemented simulation method for use in a molding process by a computer processor, comprising:
   specifying a simulating domain having a resin part and a mold part, wherein the simulating domain corresponds to a genuine domain on a molding machine;
   setting an initial resin temperature of the resin part and an initial mold temperature of the mold part;
   performing a transient state analysis to calculate a plurality of simulated temperature distributions at different times between the resin part and the mold part to obtain a plurality of simulated temperature gradients at different times, wherein the plurality of simulated temperature gradients is not actual measured data;
   calculating at least one heat transfer coefficient between the resin part and the mold part taking into consideration the plurality of simulated temperature gradients at different times;
   simulating the molding process of a molding resin that is injected into the simulating domain by using the at least one heat transfer coefficient to generate a plurality of molding conditions; and
   performing the molding process by using the plurality of molding conditions to the genuine domain on the molding machine.

\* \* \* \* \*